US006830232B2

(12) United States Patent
Burrola et al.

(10) Patent No.: US 6,830,232 B2
(45) Date of Patent: Dec. 14, 2004

(54) EVAPORATIVE SOLENOID CONTROL VALVE WITH ENHANCED DURABILITY FEATURES

(75) Inventors: Santos Burrola, Chihuahua (MX); Mahmood Rad, Brookfield, WI (US); Mark Anthony Shost, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 221 days.

(21) Appl. No.: 09/933,245

(22) Filed: Aug. 20, 2001

(65) Prior Publication Data

US 2003/0034471 A1 Feb. 20, 2003

(51) Int. Cl.[7] ................................................ F16K 31/02
(52) U.S. Cl. ..................... 251/64; 251/129.15; 335/257
(58) Field of Search ............................. 251/64, 129.15; 335/248, 257, 271, 277

(56) References Cited

U.S. PATENT DOCUMENTS

| | | | | | |
|---|---|---|---|---|---|
| 3,185,177 | A | * | 5/1965 | Brandenberg et al. | 137/625.27 |
| 3,974,998 | A | * | 8/1976 | Wood | 251/129.15 X |
| 3,977,436 | A | * | 8/1976 | Larner | 251/129.15 X |
| 4,936,337 | A | * | 6/1990 | DuHack | 251/129.15 X |
| 5,246,199 | A | * | 9/1993 | Numoto et al. | 251/129.15 |
| 5,467,961 | A | * | 11/1995 | Sausner et al. | 251/129.15 |
| 5,503,185 | A | * | 4/1996 | Krause | 137/625.65 |
| 5,503,366 | A | * | 4/1996 | Zabeck et al. | 251/129.15 X |
| 5,553,829 | A | * | 9/1996 | Hemsen | 251/64 X |
| 5,878,991 | A | * | 3/1999 | Krimmer et al. | 251/64 |
| 6,003,839 | A | * | 12/1999 | Kobayashi | 251/129.15 |
| 6,019,344 | A | * | 2/2000 | Engel et al. | 251/64 |
| 6,065,734 | A | * | 5/2000 | Tackett et al. | 251/64 X |
| 6,105,931 | A | * | 8/2000 | Frank et al. | 251/129.15 |
| 6,405,757 | B1 | * | 6/2002 | Jabcon | 137/625.65 |
| 6,425,409 | B1 | * | 7/2002 | Cross et al. | 251/129.15 X |
| 6,463,951 | B2 | | 10/2002 | Shost | |
| 6,467,495 | B2 | | 10/2002 | Shost | |
| 6,517,044 | B1 | | 2/2003 | Lin et al. | |
| 6,538,543 | B2 | | 3/2003 | Bircann et al. | |
| 6,595,485 | B2 | * | 7/2003 | Burrola et al. | 251/64 |

* cited by examiner

*Primary Examiner*—Eric Keasel
(74) *Attorney, Agent, or Firm*—Jimmy L. Funke

(57) ABSTRACT

An evaporative solenoid valve assembly for use in a vehicle fuel system between a filtration canister and an intake manifold includes a plunger having a plunger body with central-bore and an elastomeric insert molded therein to define a stop cushion at the end of the insert proximal the valve stop and a valve tip at the end of the insert proximal the valve seat. The valve assembly may include a valve stop having a non-conducting insert received in an end proximal the plunger to reduce noise and wear as well as to improve magnetic flux path. Yet another improvement includes an enlarged pre-load spring disposed within the plunger to provide better spring force distribution and plunger to valve seat alignment.

9 Claims, 2 Drawing Sheets

EVAPORATIVE SOLENOID CONTROL VALVE WITH ENHANCED DURABILITY FEATURES

TECHNICAL FIELD

The present invention relates to control valves and in particular, to an evaporative (EVAP) solenoid control valve having enhanced durability and noise reduction features.

BACKGROUND OF THE INVENTION

It is known in the art of automotive fuel systems to use an evaporative (EVAP) solenoid valve assembly to control the flow of fuel vapor through passageways connecting a purge canister and an intake manifold. One such EVAP control valve assembly includes a solenoid assembly actuated in response to a pulse width modulated (PWM) signal generated by the vehicle's central computer to induce a rubber-tipped plunger to move toward a metal stop, opening a passageway to the flow of vapor. When the solenoid is de-energized, the plunger is pushed back toward a valve seat by a pre-loaded spring situated between the stop and the plunger, causing the rubber-tip of the plunger to seal the passageway.

To reduce the noise caused by the impact of the plunger against the metal valve stop, EVAP control valve plungers have been designed to include a soft, rubber-like stop cushion at the interface with the valve stop. Repeated impact with the metal valve stop, however, may cause deterioration of the stop cushion which may, in turn, contribute to additional noise. Moreover, such cushions, generally injection molded onto a metal preform plunger body, may be formed with a dimple at or near the cushion-stop impact surface.

SUMMARY OF THE INVENTION

The present invention provides an improved evaporative control valve with enhanced durability and noise reduction features. In general, the control valve includes a valve body defining an inlet, a controlled outlet and a passageway therebetween. A valve stop and a valve seat are supported within the valve body in axial alignment with the controlled outlet. A plunger is reciprocably moveable between the valve stop and the valve seat to open and close the controlled outlet and further includes a central bore having an insert molded therein to define a stop-cushion at an end proximal the valve stop and a valve tip at an end proximal the valve seat. Connecting the stop cushion with the valve tip allows the cushion to be molded through the body of the plunger so that injection molding equipment interfaces with a non-impact surface of the insert (e.g. the side of the valve tip), and does not disturb the cushion-stop impact surface.

According to another aspect of the invention, the stop cushion may be dome-shaped to provide a greater quantity of material for enhanced impact absorption and to increase the size of the stop-impact surface. This results in less stress and wear on the assembly components.

Another aspect of the invention provides for a valve stop including a non-conducting surface, which may take the form of a plastic insert, that improves the path of the magnetic flux and reduces noise created by the impact of the plunger against the stop.

Yet another aspect of the invention includes placement of the spring within a plunger pocket formed in the end of the plunger proximal the valve stop to improve spring force distribution and plunger-to-valve seat alignment.

The above-described and other features and advantages of the present invention will be appreciated and understood by those skilled in the art from the following detailed description, drawings and appended claims.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
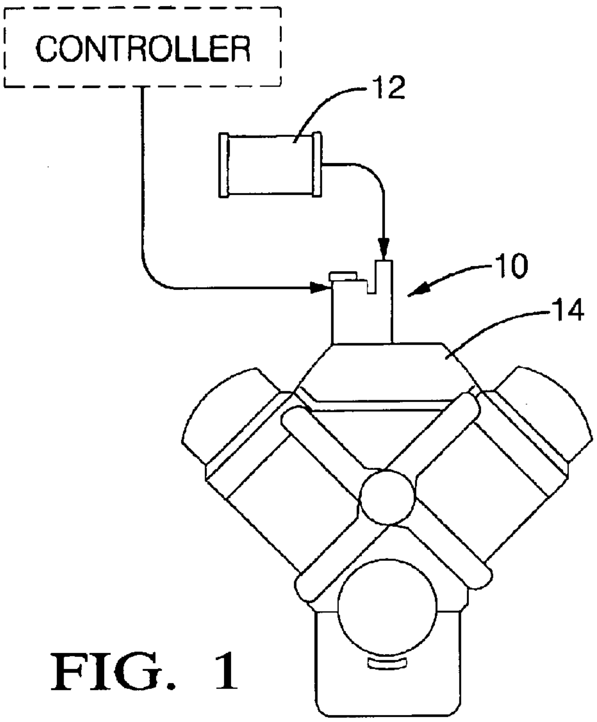
FIG. 1 is a schematic view of an EVAP valve within a fuel system.
Figure 3:
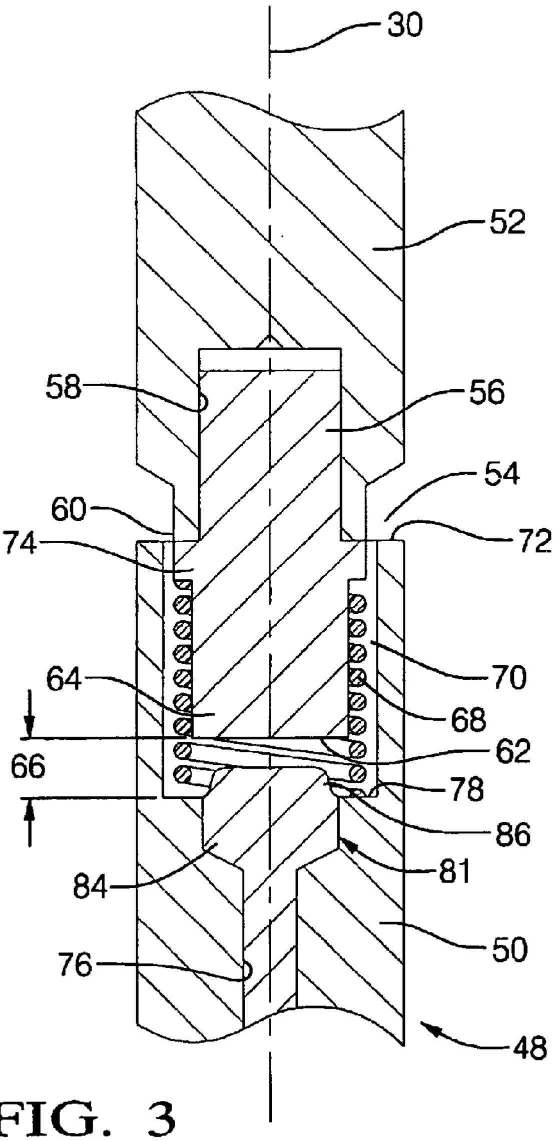
FIG. 3 is an enlarged cross-sectional view of a portion of the EVAP valve of FIG. 2.
Figure 2:
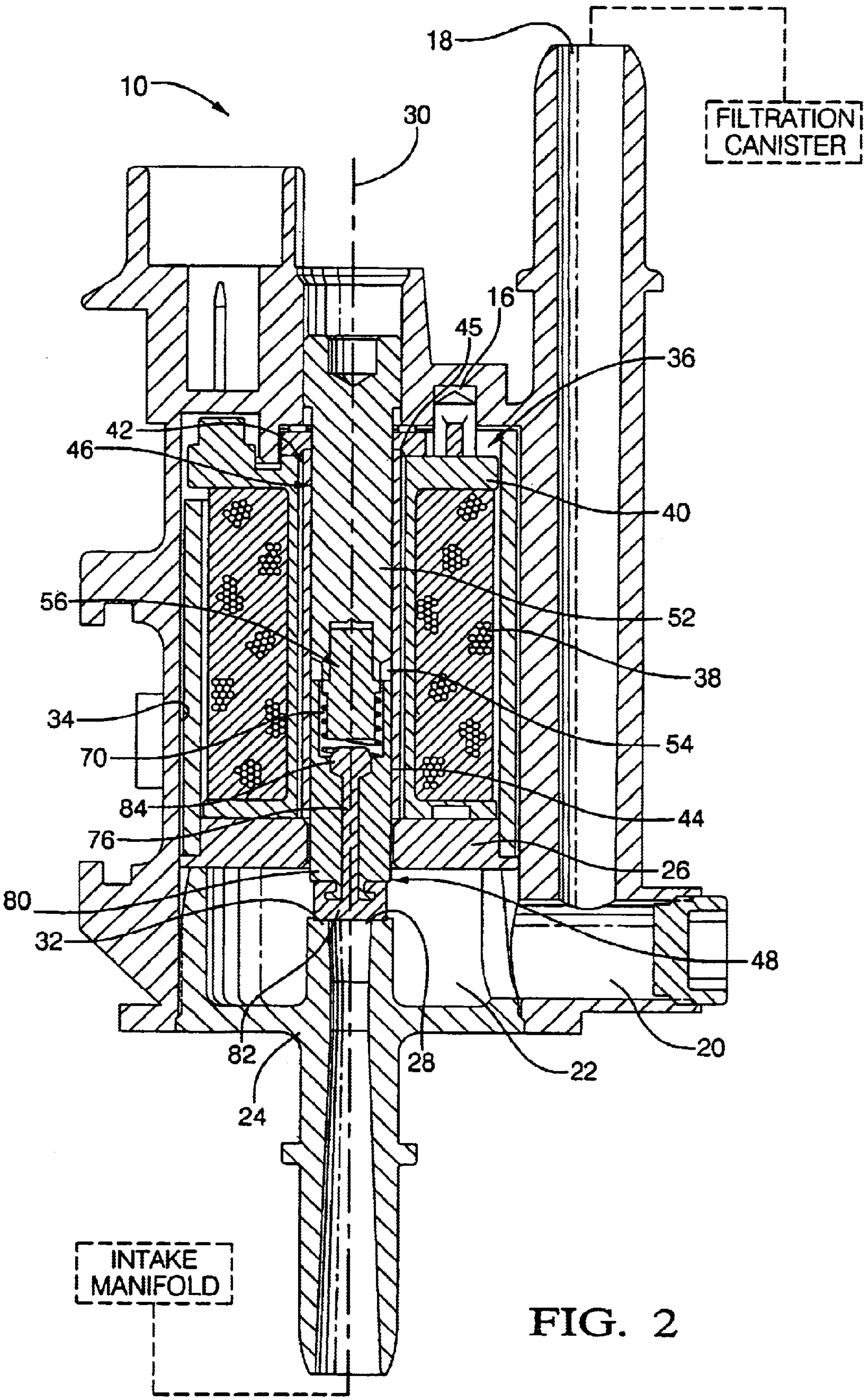
FIG. 2 is a cross-sectional view of an EVAP valve embodying all of the inventive aspects summarized above.

As shown in FIG. 1, an EVAP valve assembly 10 is operatively connected within a fuel system to control the flow of vapor between a filtration canister 12 and an intake manifold 14. FIGS. 2 and 3 illustrate in detail the valve assembly 10 which includes a valve body 16 that defines a vapor flow path from an inlet 18, connectable to the filtration canister, through a cross-passageway 20 to a lower chamber 22 formed between a valve body end cap 24 and an end plate 26. The valve body end cap 24 defines a controlled outlet 28 that extends into the lower chamber 22, and which is connectable to the intake manifold. Controlled outlet 28 is aligned on a vertical axis 30. At the interface of the lower chamber 22 and outlet 28 and in axial alignment therewith is a valve seat 32 used in opening and closing the outlet 28.

The valve body 16 further includes a central cavity 34 that houses a solenoid assembly 36. The solenoid assembly 36 includes a coil 38 wound about a spool 40 to define a central bore 42 on axis 30. The solenoid assembly 36 and a bearing 44 are supported within central cavity 34 and central bore 42 respectively, between end plate 26 and plate 45.

Bearing 44 further supports a valve stop 46 and a plunger 48, in axial alignment with the valve seat 32 and controlled outlet 28. In a preferred embodiment, the bearing 44 is preferably made of a polished material to minimize friction between the components.

The plunger 48 has a body 50 made from a conductive material, and is preferably a steel preform. The stop 46, likewise, has a conductive body 52 preferably made from steel. An air gap 54 separates the conductive stop body 52 and plunger body 50, creating a path for magnetic flux travel when the solenoid assembly 36 is energized. In this embodiment, the solenoid assembly 36 is energized by a pulse width modulated (PWM) signal generated by the vehicle's central computer (not shown).

The conductive body 52 of valve stop 46 is adapted to receive a non-conductive insert 56 (preferably plastic) that is press fit into a bore 58 formed in an end 60 of the conductive stop body 52 proximal the plunger 48 axially extending beyond the end 60 of the conductive stop body 52 along the axis 30. The insert 56 has a plunger-impact surface 62 at end 64. In its normally seated or closed position, shown in FIG. 2, the plunger 48 is separated from the plunger-impact surface 62 by a gap 66 of predetermined size depending on the desired stroke of the solenoid assembly 36.

The particular non-conductible stop insert 56 illustrated in FIGS. 2 and 3 has the added advantage of enhancing alignment on axis 30 between a spring 68 mounted about the insert 56 and received in a pocket 70 formed in an end 72 of the plunger body 50 proximal the valve stop 46. The pocket 70 is appropriately sized and shaped to create the desired gap 66 as well as to enclose the spring 68. To this end, the insert 56 is shown to include an annular shoulder 74 which retains the spring 68 against the compressive force of the plunger 48 as it moves toward the plunger-impact surface 62 of the valve stop 46. Normally, the spring 68 biases the plunger 48 to seat against the valve seat 32. The outer diameter of the spring 68 is at least 50% of the diameter of the pocket, making it easier to handle. As shown in FIG. 2, the spring 68 is received between the base of pocket 78, and the annular shoulder 74 of the plastic insert 56.

The plunger body 50 has a central bore 76 axially extending from the base 78 of the pocket 70 to the opposite end 80 along the axis of plunger movement, in this case, axis 30. An insert 81 defining a valve tip 82 is formed on the end 80 of the plunger body 50 for sealing engagement with the valve seat 32 and is connected to a stop cushion 84 that protrudes through the pocket base 78 into the pocket 70 formed in the end 72 of the plunger 48 proximal the valve stop 46. This uniquely connected valve tip 82 and stop-cushion 84 permits both elements to be manufactured by a single shot injection molding process delivering material through the central bore 76 in the plunger body 50 (the preform) to the opposite end 80 of the plunger body 50. In this way, the injection molding equipment does not interface directly with the outer surface of the stop-cushion 84 in any way, therefore, eliminating the formation of dimples by supply gates or risers.

The particular stop cushion 84 shown in FIGS. 2 and 3 has a dome-shape which provides additional material to absorb the shock of impact with the plastic insert 56 of the valve stop 46 and a greater stop-impact surface 86 area for engaging the plunger impact surface 62 of the plastic insert 56 of the stop 46. Due to its unique shape, greater dampening material of the stop cushion 84 come into engagement with the plastic insert 56 of the stop 46 as the cushion 84 is compressed during impact. Stop cushion 84 may be made of rubber or a flouroelastomer.

In operation, the EVAP control valve assembly 10 may be installed as shown in FIG. 1, between a filtration canister 12 and an intake manifold 14. As shown in FIG. 2, vapor flows from the filtration canister, through inlet 18 and cross-passageway 20 into lower chamber 22, where the vapor will be retained until the plunger is moved from its normally seated position against valve seat 28 to open the controlled outlet leading to the intake manifold. In this embodiment, the solenoid assembly 36 operates in the plunger creating a magnetic force that pulls the plunger 48 toward the valve stop 46 where the plunger's dome-shaped stop cushion 84 impacts the plastic stop insert 56 and compress, to reduce the force of impact and any resulting noise. Since the insert 56 is preferably plastic, noise that may be created by the plunger 48 upon impact with the valve stop 46 is reduced and the path of the magnetic flux improved. When the solenoid assembly 36 is de-energized, the pre-load spring 68 pushes the plunger 48 back toward the valve seat 32 with enough force to seal the controlled outlet 28, retaining the vapor in the lower chamber 22 until the solenoid assembly 36 is re-energized.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Accordingly, it is to be understood that the present invention has been described by way of illustration and not limitation.

What is claimed is:

1. A valve assembly comprising:

a valve body defining an inlet, a controlled outlet and a passageway therebetween;

a valve stop and a valve seat supported within said valve body in axial alignment with said controlled outlet, wherein the valve stop includes a plunger-impact surface formed of a non-conductive material; and a plunger reciprocable between the valve stop and the valve seat to open and close said controlled outlet, said plunger further including a pocket having a diameter, and a central bore having an insert molded therein to define a stop-cushion at an end proximal the valve stop and a valve tip at an end proximal the valve seat, wherein a portion of the valve stop is disposed within the pocket.

2. A valve assembly comprising:

a valve body defining an inlet, a controlled outlet and a passageway therebetween;

a valve stop and a valve seat supported within said valve body in axial alignment with said controlled outlet, wherein the valve stop includes a non-conductive insert received in an end proximal the plunger; and a plunger reciprocable between the valve stop and the valve seat to open and close said controlled outlet, said plunger further including a pocket having a diameter, and a central bore having an insert molded therein to define a stop-cushion at an end proximal the valve stop and a valve tip at an end proximal the valve seat, wherein a portion of the valve stop is disposed within the pocket.

3. The valve assembly of claim 2, wherein the portion of the valve stop disposed within the pocket is at least a portion of the non-conductive insert.

4. The valve assembly of claim 3 wherein the non-conductive insert has an annular shoulder for retaining a spring within the pocket of the plunger.

5. The valve assembly of claim 4 wherein the pocket has a predetermined diameter and the spring has an outer diameter at least 50% of the diameter of the pocket.

6. The valve assembly of claim 4, wherein the spring is mounted about the non-conductive insert.

7. A valve assembly comprising:

a valve body defining an inlet, a controlled outlet and a passageway therebetween;

a valve stop and a valve seat supported within said valve body in axial alignment with said controlled outlet; and a plunger reciprocable between the valve stop and the valve seat to open and close said controlled outlet, said plunger further including a pocket having a diameter, wherein said pocket receives a spring that urges the plunger toward the valve seat to close the passageway, wherein the spring has an outer diameter at least 50% of the diameter of the pocket; and a central bore having an insert molded therein to define a stop-cushion at an end proximal the valve stop and a valve tip at an end proximal the valve seat, wherein a portion of the valve stop is disposed within the pocket.

8. A method of manufacturing a valve assembly having a plunger reciprocably moveable within the valve assembly between a valve stop and a valve seat, the method comprising:

providing a conductive elongated plunger body having a central bore formed therein;

molding an insert within the plunger body to define a stop-cushion at an end proximal the valve stop and a valve tip proximal an end proximal the valve seat;

providing a bore in an end of the valve stop;

and press fitting a non-conductive insert into the bore of the valve stop.

9. A valve assembly comprising:

a valve body defining an inlet, a controlled outlet and a passageway therebetween;

a valve stop and a valve seat supported within said valve body in axial alignment with said controlled outlet;

a plunger reciprocable between the valve stop and the valve seat to open and close said controlled outlet, said plunger further including a pocket having a diameter, and a central bore having an insert molded therein to define a stop-cushion at an end proximal the valve stop and a valve tip at an end proximal the valve seat, wherein a portion of the valve stop is disposed within the pocket; and a solenoid assembly and a non-conductive insert extending beyond the end of the valve stop, wherein the conductive bodies of the valve stop and the plunger are separated by an air gap for creating a path for magnetic flux travel when the solenoid assembly is energized.

* * * * *